(12) United States Patent
Kim et al.

(10) Patent No.: US 8,521,171 B2
(45) Date of Patent: Aug. 27, 2013

(54) METHOD OF ALLOCATING RADIO RESOURCE IN BROADBAND WIRELESS ACCESS SYSTEM

(75) Inventors: Jeong Ki Kim, Gyeonggi-do (KR); Ki Seon Ryu, Gyeonggi-do (KR); Hee Jeong Cho, Gyeonggi-do (KR); Jae Won Lim, Gyeonggi-do (KR); Sung Woong Ha, Gyeonggi-do (KR); Chang Hun Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 12/738,232

(22) PCT Filed: Oct. 15, 2008

(86) PCT No.: PCT/KR2008/006077
§ 371 (c)(1),
(2), (4) Date: Aug. 2, 2010

(87) PCT Pub. No.: WO2009/051403
PCT Pub. Date: Apr. 23, 2009

(65) Prior Publication Data
US 2010/0290411 A1   Nov. 18, 2010

(30) Foreign Application Priority Data
Oct. 18, 2007   (KR) .................. 10-2007-0105223

(51) Int. Cl.
*H04W 40/00*   (2009.01)

(52) U.S. Cl.
USPC .......................................... 455/445; 370/329

(58) Field of Classification Search
USPC ................... 455/445; 370/329, 401
See application file for complete search history.

(56) References Cited

U.S. PATENT DOCUMENTS

| | | | |
|---|---|---|---|
| 7,139,277 B2 * | 11/2006 | Ofek et al. | 370/401 |
| 2006/0165188 A1 | 7/2006 | Wunder et al. | |
| 2006/0189321 A1 | 8/2006 | Oh et al. | |
| 2007/0060145 A1 * | 3/2007 | Song et al. | 455/445 |
| 2010/0195607 A1 * | 8/2010 | Lee et al. | 370/329 |
| 2010/0290411 A1 * | 11/2010 | Kim et al. | 370/329 |

FOREIGN PATENT DOCUMENTS

WO   2005-112357   11/2005

* cited by examiner

*Primary Examiner* — William D Cumming
(74) *Attorney, Agent, or Firm* — Lee, Hong, Degerman, Kang & Waimey

(57) ABSTRACT

A method for allocating resource regions in a wireless access system. This method collectively allocates resources in non-consecutive frames. Specifically, a message, including allocation information used to collectively and non-consecutively allocate identical resource regions, is received from a base station and data is transmitted or received through the allocated resource regions. Since identical resource regions are collectively allocated in multiple frames, it is possible to reduce both the number of transmissions of a MAP message and MAP overhead in a network.

13 Claims, 4 Drawing Sheets

METHOD OF ALLOCATING RADIO RESOURCE IN BROADBAND WIRELESS ACCESS SYSTEM

CROSS-REFERENCE TO RELATED APPLICATIONS

This application is the National Stage filing under 35 U.S.C. §371 of International Application No. PCT/KR2008/006077, filed on Oct. 15, 2008, which claims the benefit of earlier filing date and right of priority to Korean Application No. 10-2007-0105223, filed on Oct. 18, 2007.

TECHNICAL FIELD

The present invention relates to a method for allocating resource regions in a wireless access system, and more particularly, to a method for collectively allocating resource regions in non-consecutive frames.

BACKGROUND ART

First, reference is made to a general method for allocating uplink resources in a broadband wireless access system. A base station allocates resources taking into consideration a channel status (i.e., Channel Quality Information (CQI)), the amount of data delay, throughput, and Quality of Service (QoS) of each mobile terminal.

Here, a Proportionally Fairness Scheduler (PFS) is used to determine mobile terminals that will use Partial Usage of Subchannels (PUSCs) including distributed subcarriers of the OFDMA system. One frame can be divided into a number of scheduling resources. The base station sequentially performs PFS until all scheduled resources are allocated. This process is repeated every frame.

According to the PFS result, the base station can allocate one or more mobile terminals to one frame. PFS is a method used to select mobile terminals which maximizes the value obtained by dividing the maximum amount of data $T\_inst_i(t)$ according to a channel status at a scheduling time "t" by the average amount of actually transmitted data $T\_smoothed_i(t)$ as in the following Equation 1. Here, the process of Equation 1 is not performed when there is no data to be transmitted to the mobile terminals.

$$M_i(t) = \frac{T\_inst_i(t)}{T\_smoothed_i(t)} \quad \text{[EQUATION 1]}$$

At any scheduling instant t, the scheduling metric $M_i(t)$ for subscriber i

An average data amount $T\_smoothed_i(t)$ which is a denominator in Equation 1 is calculated each time after resources are allocated as in the following Equation 2. A parameter "$T_{PF}$" in Equation 2 represents the size of a window during which the service can be maintained without receiving data. In Equation 2, the current transmission amount "$T\_inst_i$" of all mobile terminals excluding mobile terminals selected at time "t" is "0".

$$T\_smoothed_i(t) = \frac{1}{T_{PF}} * T\_inst_i(t) + \left(1 - \frac{1}{T_{PF}}\right) * T\_smoothed_i(t-1) \quad \text{EQUATION 2}$$

The following Table 1 represents QoS of various services. The Unsolicited Grant Service (UGS) is sensitive to transmission delay and the sensitivity of each service to transmission delay decreases in the order arranged in the table (i.e., the Best Effort (BE) least sensitive to transmission delay).

TABLE 1

| Service | Definition | Applications | Mandatory QoS Parameters |
|---|---|---|---|
| UGS (Unsolicited Grant Service) | Real-time data streams consisting of fixed-size data Packets issued at periodic Intervals | T1/E1, VoIP w/o silence Suppression | Max. Sustained Traffic Rate = Min. Reserved Traffic Rate Maximum Latency Tolerated Jitter Uplink Grant Scheduling Type Request/Transmission Policy Unsolicited Grant Interval (Vendor specific) |
| rtPS | Real-time data streams consisting of variable-sized data packets that are issued at periodic intervals | MPEG video | Minimum Reserved Traffic Rate Maximum Sustained Traffic Rate Maximum Latency Uplink Grant Scheduling Type Request/Transmission Policy |
| nrtPS | Delay-tolerant data streams consisting of variable-sized data packets for which minimum data rate is required | FTP | Minimum Reserved Traffic Rate Maximum Sustained Traffic Rate Traffic Priority Uplink Grant Scheduling Type Request/Transmission Policy |

TABLE 1-continued

| Service | Definition | Applications | Mandatory QoS Parameters |
|---|---|---|---|
| BE | Data streams for which no Minimum service level is required and therefore may be handled on a space-available basis | HTTP | Maximum Sustained Traffic Rate Traffic Priority Request/Transmission Policy |

Information of uplink resources allocated using the method described above is transmitted to each mobile terminal through a UL-MAP message every frame. That is, when a mobile terminal transmits uplink data to the base station, the mobile terminal must utilize multiple frames in order to transmit the entirety of the data.

In order to transmit data to the base station, the mobile terminal attempts to make an uplink allocation request (i.e., a Bandwidth Request (BR)) for the uplink. The mobile terminal can request uplink resources of up to 524,287 bytes using a BR header, a BR and UL Tx power report header, a BR and CINR report header, a BR and UL sleep control header, etc.

For example, when it is assumed that only one mobile terminal in a cell desires to receive a File Transfer Protocol (FTP) service with a mean size of 19,500 bytes or a Hypertext Transfer Protocol (HTTP) service with a mean size of 34,500 bytes, the mobile terminal must utilize multiple frames in order to transmit the entirety of data.

In addition, in the case where the cell includes a large number of mobile terminals which receive a variety of services, the mobile terminals must share resources remaining after resources are allocated to a service with QoS higher than that of FTP or HTTP. Thus, each mobile terminal will transmit data through a larger number of frames.

FIG. 1 illustrates a general method in which a Base Station (BS) allocates uplink resource regions to a mobile terminal or Mobile Station (MS).

The BS can allocate resources to the MS through multiple frames in order to transmit a large amount of traffic. The multiple frames may include consecutive or non-consecutive frames. Here, when the BS allocates resources to the MS through multiple frames in a wireless access system (for example, the IEEE 802.16e system), the BS notifies the MS of allocation information using a UL-MAP message every frame. In this case, MAP overhead may occur.

As shown in FIG. 1, the BS allocates wireless resources to the MS through a UL-MAP message (S101). At step S101, the BS allocates a frame including a transmission region to allow the MS to transmit data to the BS.

The MS transmits data to the BS using transmission information allocated to one frame included in the UL-MAP message received at step S101 (S102).

When the MS has not yet transmitted the entirety of the data, the BS reallocates a transmission region of one frame to the MS using a UL-MAP message (S103).

The MS transmits data to the BS through the transmission region of the frame allocated at step S103 (S104) and these steps are repeated every frame until the MS transmits the entirety of the data (S105 and S106).

DISCLOSURE

Technical Problem

As shown in FIG. 1, the BS needs to allocate a resource region required to transmit data to the MS every frame. Thus, significant overhead may occur since the BS needs to repeatedly transmit a UL-MAP message to the MS in order to allocate a resource region to the MS.

In addition, transmission of allocation information on a frame-by-frame basis may be inefficient since it is likely that a resource region is allocated to only one MS during a specific period due to the characteristics of the PFS.

An object of the present invention devised to solve the above problems lies in providing a method for efficiently allocating resources.

Another object of the present invention devised to solve the problem lies in providing a method in which radio resources are not allocated on a frame-by-frame basis but instead identical transmission regions in one or more non-consecutive frames are collectively allocated for efficient allocation of resources to reduce network overhead.

Technical Solution object of the present invention can be achieved by providing a method for allocating resource regions in a wireless access system, wherein fixed transmission regions are collectively allocated in one or more non-consecutive frames.

In one aspect of the present invention, provided herein is a method for allocating resource regions in a broadband wireless access system, the method including receiving a message, including allocation information used to collectively and non-consecutively allocate identical resource regions, from a base station, and transmitting or receiving data through the allocated resource regions.

In this method, the message may further include first information used to collectively allocate identical resource regions in order to periodically transmit or receive the data. The first information may include information indicating the total number of allocated frames and an allocation period in order to periodically transmit or receive the data.

In addition, in the method, the message may further include second information used to collectively allocate identical resource regions in order to aperiodically transmit or receive data. The second information may include information of positions of frames including identical resource regions in order to aperiodically transmit or receive data.

In another aspect of the present invention, provided herein is a method for allocating resource regions in a broadband wireless access system, the method including transmitting a message, including allocation information used to collectively and non-consecutively allocate identical resource regions, to a mobile terminal, and transmitting or receiving data through the allocated resource regions.

In this method, the message may further include first information used to collectively allocate identical resource regions for periodically transmitting or receiving the data. The first information may include information indicating the total number of allocated frames and an allocation period in order to periodically transmit or receive the data.

In addition, in the method, the message may further include second information used to collectively allocate identical resource regions in order to aperiodically transmit or receive data. The second information may include information of positions of frames including identical resource regions in order to aperiodically transmit or receive data.

ADVANTAGEOUS EFFECTS

The present invention has the following advantages.

First, the number of transmissions of a MAP message is reduced since radio resources are not allocated in each frame but instead identical transmission regions are collectively allocated in multiple frames, unlike conventional methods. This reduces MAP overhead in a network.

Second, signaling overhead of the mobile terminal is reduced since it is unnecessary for the mobile terminal to repeatedly receive a message to transmit data.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
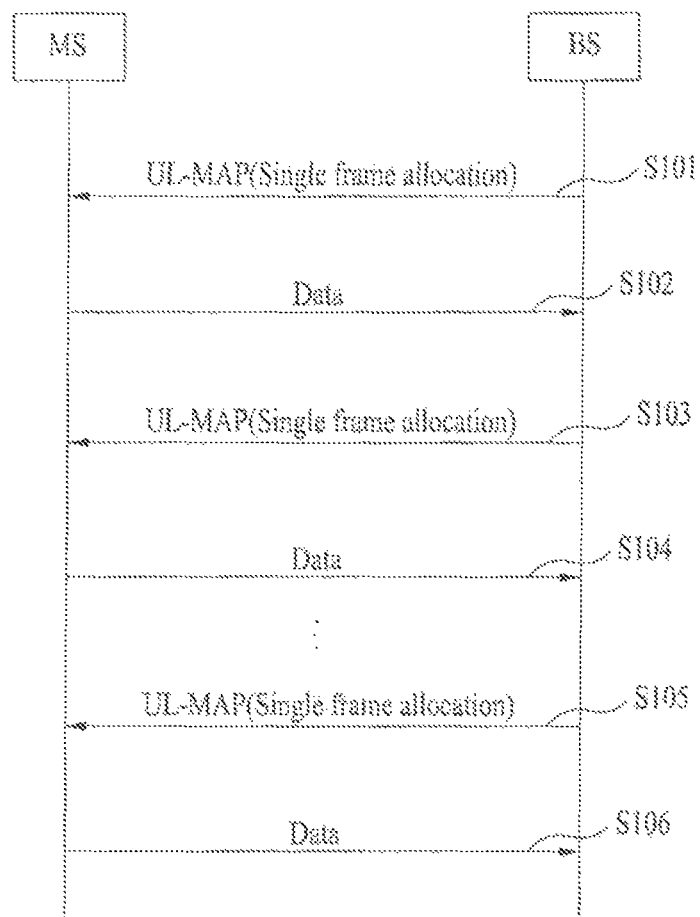
FIG. 1 illustrates a general method in which a Base Station (BS) allocates uplink resource regions to a mobile terminal or Mobile Station (MS).

To overcome the above problems, the present invention provides a method for allocating resources in a wireless access system wherein resources are collectively allocated in non-consecutive frames.

The following embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment.

Specific terms used in the following description are provided for better understanding of the present invention and can be replaced with other terms without departing from the technical idea of the present invention.

The embodiments of the present invention have been described focusing mainly on the data communication relationship between a mobile terminal and a Base Station (BS). The BS is a mobile terminal node in a network which performs communication directly with the mobile terminal. Specific operations which have been described as being performed by the BS may also be performed by an upper node above the BS as needed.

That is, it will be apparent to those skilled in the art that the BS or any other network node may perform various operations for communication with mobile terminals in a network including a number of network nodes including BSs. The term "base station (BS)" may be replaced with another term such as "fixed station", "Node B", "eNode B (eNB)", or "access point". The term "mobile terminal" may also be replaced with another term such as "user equipment (UE)", "mobile station (MS)", "terminal", or "mobile subscriber station (MSS)".

The frame used in the embodiments of the present invention can be used as a specific frame in the IEEE 802.16e system and can be used as a specific frame or a specific subframe in the IEEE 802.16m system.

The embodiments of the present invention can be implemented by hardware, firmware, software, or any combination thereof. In the case where the present invention is implemented by hardware, methods according to the embodiments of the present invention may each be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, methods according to the embodiments of the present invention may each be implemented in the form of modules, processes, functions, or the like which perform the features or operations described above. Software code can be stored in a memory unit so that a processor can execute it. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the technical idea of the present invention can be supported by the standard documents. For all terms used in this disclosure, reference can be made to the standard documents. Especially, the embodiments of the present invention can be supported by at least one of P802.16-2004, P802.16e-2005, and P802.16Rev2 which are standard documents of the IEEE 802.16 system.

Reference will now be made to an example wherein a Base Station (BS) allocates resource regions to a mobile terminal (or, Mobile Station (MS)).

The BS can transmit uplink resource information to the MS through a UL-MAP message. Here, in order to transmit uplink resource information to the MS, the BS can use a block allocation scheme in which the BS notifies the MS of an OFDM symbol offset, the number of allocated OFDM symbols, a subchannel offset, and the number of allocated subchannels or a slot allocation scheme in which the BS notifies the MS of subchannel offset information and durations of allocated slots.

The block allocation scheme can be used in fast feedback (UIUC=0), HARQ ACK CH region (UIUC=11 (Extended-2 UIUC) with Type=8), CDMA ranging and BW request allocation (UIUC=12), and PAPR/safety zone allocation (UIUC=13) schemes.

The slot allocation scheme can be used for any case where the block allocation scheme is not used. When the slot allocation scheme is used in Non-Adaptive Antenna System (Non-AAS) zones, the start position of an initial region can be determined by an "allocation start time" field in the UL-MAP message and the start positions of other allocation regions can be determined based on immediately previous allocation regions in the UL-MAP message (i.e., using relative offsets).

However, when the slot allocation scheme is used in an AAS UL zone, the start position of the allocation region can be determined by absolute offset information explicitly indicated in the UL-MAP message.

The following Table 2 illustrates the usage of an Uplink Interval Usage Code (UIUC) used in the block allocation scheme or the slot allocation scheme.

TABLE 2

| UIUC | Usage |
|---|---|
| 0 | Fast-Feedback channel |
| 1-10 | Different burst profiles (Data Grant Burst Type) |
| 11 | Extended UIUC 2 IE |
| 12 | CDMA BR, CDMA ranging |
| 13 | PAPR reduction allocation, safety zone, Sounding Zone |
| 14 | CDMA Allocation IE |
| 15 | Extended UIUC |

The embodiments of the present invention will now be described with reference to the accompanying drawings.

Figure 2:
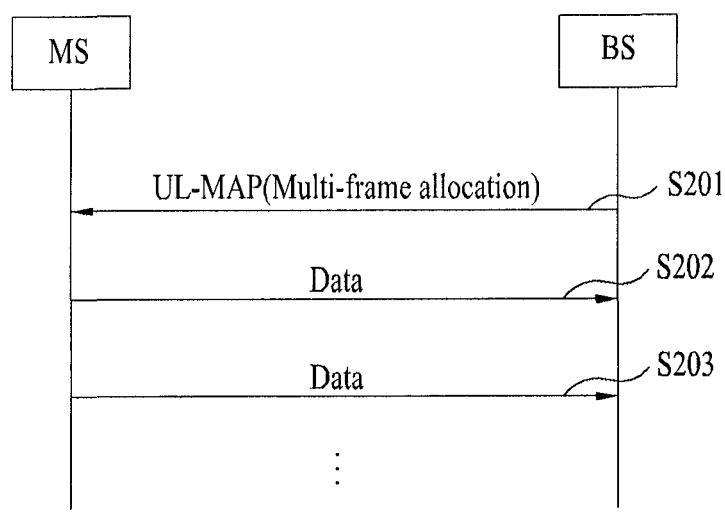
FIG. 2 illustrates a method in which a number of frames, in which identical resource regions have been allocated, are non-consecutively transmitted to an MS.

FIG. 2 illustrates a method in which a number of frames, in which identical resource regions have been allocated, are non-consecutively transmitted to an MS.

In an embodiment of the present invention, the BS can define a multi-frame allocation IE using an extended UIUC parameter in order to non-consecutively allocate the same resource regions to one or more frames. The same wireless resource regions are not consecutive in the case where the BS periodically allocates wireless resources to the MS in specific frames or in the case where the BS non-consecutively and randomly allocates specific frames to the MS. These two cases are similar in that identical resource regions in different frames are allocated to the MS.

As shown in FIG. 2, the BS can transmit a UL-MAP message containing a multi-frame allocation IE to the MS in order to non-consecutively allocate multiple frames to the MS (S201).

Table 3 illustrates an example format of the multi-frame allocation IE that can be used at step S201.

TABLE 3

| Syntax | Size | notes |
|---|---|---|
| UL multi-frame allocation-2 IE { | — | — |
|   Extended UIUC | 4 | 0x0D |
|   Length | 4 | |
|   UIUC | 4 | UIUC used for the burst. |
|   OFDMA Symbol offset | 8 | |
|   Subchannel offset | 7 | |
|   No. OFDMA Symbols | 7 | |
|   No. Subchannels | 7 | |
|   Repetition Coding Indication | 2 | 00: No repetition coding<br>01: Repetition coding of 2 used<br>10: Repetition coding of 4 used<br>11: Repetition coding of 6 used |

TABLE 3-continued

| Syntax | Size | notes |
|---|---|---|
|   Type | 1 | |
|   If (Type ==0) { | | |
|     Total No. frames | 2 | Indicate the number of allocated frames excluding the current frame.<br>0b00 = 1<br>0b01 = 2<br>0b10 = 3<br>0b11 = 4 |
|     Allocation Period | 2 | Interval between allocated frames |
|   } else { | | |
|     Frame bit-MAPs | 8 | Indicate positions of consecutive frames received next to frame allocated through MAP.<br>For example when current frame number is "n", bit #0 indicates n + 1th frame and bit #1 indicates n + 2th frame.<br>.<br>.<br>.<br>bit #7 indicates n + 8th frame. |
|   } | | |
|   Paddings | variables | Number of bits required to align to byte length; shall be set to zero |
| } | | |

Table 3 illustrates the case where the block allocation scheme is used as a resource allocation scheme. The BS can non-consecutively allocate the same resource regions to the MS using the block allocation scheme. Here, it is assumed that the MS can recognize extended UIUC parameters.

The BS can notify the MS of an OFDMA symbol offset, the number of OFDMA symbols, a subchannel offset, the number of subchannels, and the number of frames using the multi-frame allocation information of Table 3. The MS can recognize non-consecutively allocated data transmission regions based on the multi-frame allocation information included in the UL-MAP message.

When the "type" parameter in Table 3 is set to "1", this indicates that non-consecutive resource regions are allocated aperiodically. Here, the "Frame bit-MAPs" parameter can indicate positions of frames including resource regions allocated to transmit uplink data, the frames being subsequent to a frame allocated through a MAP message.

For example, when the current frame number is "n", bit #0 indicates the n+1th frame and bit #1 indicates the n+2th frame. In this manner, it is possible to determine the non-consecutive and aperiodic positions of frames in which transmission regions are allocated.

When the "type" parameter in Table 3 is set to "0", this indicates that non-consecutive resource regions are allocated periodically. Here, the "Total No. frames" parameter indicates the total number of allocated frames excluding the current frame through which the UL-MAP message has been received. That is, "0b00" indicates that resources have been allocated to 1 frame, "0b01" indicates that resources have been allocated to 2 frames, "0b10" indicates that resources have been allocated to 3 frames, and "0b11" indicates that resources have been allocated to 4 frames. The "Allocation Period" parameter can indicate a periodic interval between frames to which resource regions have been allocated.

Table 4 illustrates another example format of the multi-frame allocation IE that can be used at step S201.

TABLE 4

| Syntax | Size | notes |
|---|---|---|
| UL multi-frame allocation-2-IE { | — | — |
| Extended UIUC | 4 | 0x0D |
| Length | 4 | |
| UIUC | 4 | UIUC used for the burst. |
| Slot offset | 10 | Start position of allocation region |
| Duration | 10 | Size of allocation region |
| Repetition Coding Indication | 2 | 00: No repetition coding<br>01: Repetition coding of 2 used<br>10: Repetition coding of 4 used<br>11: Repetition coding of 6 used |
| Type | 1 | |
| If (Type ==0) { | | |
|   Total No. frames | 2 | Indicate the number of allocated frames excluding the current frame.<br>0b00 = 1<br>0b01 = 2<br>0b10 = 3<br>0b11 = 4 |
|   Allocation Period | 2 | Interval between allocated frames |
| } else { | | |
|   Frame bit-MAPs | 8 | Indicate positions of consecutive frames received next to frame allocated through MAP.<br>For example when current frame number is "n", bit #0 indicates n + 1th frame and bit #1 indicates n + 2th frame.<br>.<br>.<br>.<br>bit #7 indicates n + 8th frame. |
| } | | |
| Paddings | variables | Number of bits required to align to byte length; shall be set to zero |
| } | | |

Table 4 illustrates the case where the slot allocation scheme is used as a resource allocation scheme. The BS can non-consecutively allocate transmission regions to the MS using the slot allocation scheme. Here, it is assumed that the MS can recognize extended UIUC parameters.

The BS can notify the MS of the start position of region, to which radio resources have been allocated, using the "slot offset" parameter in Table 4. The BS also notifies the MS of the size of the allocation region through the "Duration" parameter.

When the "type" parameter in Table 4 is set to "1", this indicates that non-consecutive resource regions are allocated aperiodically. Here, the "Frame bit-MAPs" parameter can indicate positions of frames including resource regions allocated to transmit uplink data, the frames being subsequent to a frame allocated through a MAP message.

For example, when the current frame number is "n", bit #0 indicates the n+1th frame and bit #1 indicates the n+2th frame. In this manner, it is possible to determine the non-consecutive and aperiodic positions of frames to which transmission regions are allocated.

When the "type" parameter in Table 4 is set to "0", this indicates that non-consecutive resource regions are allocated periodically. Here, the "Total No. frames" parameter indicates the total number of allocated frames excluding the current frame. That is, "0b00" indicates that resources have been allocated to 1 frame, "0b01" indicates that resources have been allocated to 2 frames, "0b10" indicates that resources have been allocated to 3 frames, and "0b11" indicates that resources have been allocated to 4 frames. The "Allocation Period" parameter can indicate a periodic interval between frames to which resource regions have been allocated.

The embodiments of the present invention can also be applied to downlink resource allocation. The following Table 5 illustrates another example of the multi-frame allocation IE format when the embodiments of the present invention are allocated to downlink resource allocation.

TABLE 5

| Syntax | Size | notes |
|---|---|---|
| DL multi-frame allocation-2-IE { | — | — |
| Extended DIUC | 4 | 0x0D |
| Length | 4 | |
| DIUC | 4 | DIUC used for the burst. |
| OFDMA Symbol offset | 8 | |
| Subchannel offset | 7 | |
| Boosting | 3 | 000: Normal (not boosted);<br>001: +6 dB; 010: −6 dB; 011: +9 dB; 100: +3 dB; 101: −3 dB;<br>110: −9 dB; 111: −12 dB; |
| No. OFDMA Symbols | 7 | |
| No. Subchannels | 7 | |
| Repetition Coding Indication | 2 | 00: No repetition coding<br>01: Repetition coding of 2 used<br>10: Repetition coding of 4 used<br>11: Repetition coding of 6 used |
| Type | 1 | |
| If (Type ==0) { | | |
|   Total No. frames | 2 | Indicate the number of allocated frames excluding the current frame.<br>0b00 = 1<br>0b01 = 2<br>0b10 = 3<br>0b11 = 4 |
|   Allocation Period | 2 | Interval between allocated frames |
| } else { | | |
|   Frame bit-MAPs | 8 | Indicate positions of consecutive frames received next to frame allocated through MAP.<br>For example when current frame number is "n", bit #0 indicates n + 1th frame and bit #1 indicates n + 2th frame.<br>.<br>.<br>.<br>bit #7 indicates n + 8th frame. |
| } | | |
| Paddings | variables | Number of bits required to align to byte length; shall be set to zero<br>* If FMT = 0, the size of Paddings will be 7<br>*Else, the size of paddings will be 3 |
| } | | |

Table 5 illustrates the case where the block allocation scheme is used as a resource allocation scheme. The BS can non-consecutively allocate the same resource regions to the MS using the block allocation scheme. Here, it is assumed that the MS can recognize extended UIUC parameters.

The BS can notify the MS of an OFDMA symbol offset, the number of OFDMA symbols, a subchannel offset, the number of subchannels, and the number of frames using the multi-frame allocation IE of Table 5. The MS can recognize non-consecutively allocated data transmission regions based on the multi-frame allocation information included in the UL-MAP message.

When the "type" parameter in Table 5 is set to "1", this indicates that non-consecutive resource regions are allocated aperiodically. Here, the "Frame bit-MAPs" parameter can indicate positions of frames including resource regions allocated to transmit uplink data, the frames being subsequent to a frame allocated through a MAP message.

For example, when the current frame number is "n", bit #0 indicates the n+1th frame and bit #1 indicates the n+2th frame. In this manner, it is possible to determine the non-consecutive and aperiodic positions of frames to which transmission regions are allocated.

When the "type" parameter in Table 5 is set to "0", this indicates that non-consecutive resource regions are allocated periodically. Here, the "Total No. frames" parameter indicates the total number of allocated frames excluding the current frame. That is, "0b00" indicates that resource regions have been allocated to 1 frame, "0b01" indicates that resources have been allocated to 2 frames, "0b10" indicates that resources have been allocated to 3 frames, and "0b11" indicates that resources have been allocated to 4 frames. The "Allocation Period" parameter can indicate an interval between frames to which resource regions have been allocated.

Returning to FIG. 2, the MS can transmit data to the BS through identical transmission regions of frames, which have been non-consecutively allocated, using the allocation information included in the message received at step S201 (S202 and S203).

Using the method describe above, the BS can transmit a UL-MAP message to the MS in consecutive frames, instead of transmitting a UL-MAP message every frame (i.e., on a frame-by-frame basis). This reduces MAP overhead in a network and the number of internal signaling messages, thereby enabling more efficient data transmission and reception.

Figure 3:
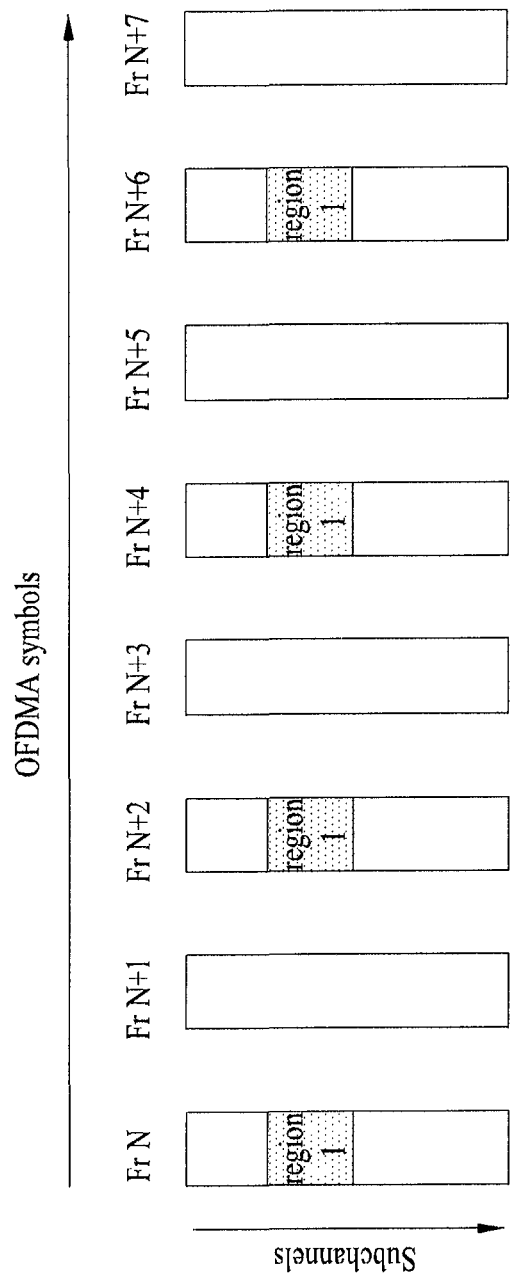
FIG. 3 illustrates a method in which downlink resource regions are non-consecutively and periodically allocated according to another embodiment of the present invention.

FIG. 3 illustrates a method in which downlink resource regions are non-consecutively and periodically allocated according to another embodiment of the present invention.

A horizontal axis in FIG. 3 represents the temporal order of OFDMA symbols and a vertical axis represents logical positions of subchannels.

FIG. 3 illustrates an example wherein a "Type" parameter of downlink multi-frame allocation information (DL_multi-frame allocation-2 IE) has been set to "0". That is, in the example of FIG. 3, frames including the same resource region are non-consecutively and periodically allocated to the MS.

When the MS has received downlink multi-frame allocation information (DL_multi-frame allocation-2 IE) in a DL-MAP message through a specific frame (for example, "Fr N"), the MS can use the same allocation region (region 1) not only in the frame through which the DL-MAP message has been received but also in specified frames (for example, Fr N+2, Fr N+4, and Fr N+6) received subsequently to the frame. The following is a description of an example wherein the "Total No. frames" parameter is "0b10" and the "allocation Period" parameter is "0b01".

Since the "Total No. frames" parameter in the DL-MAP message received by the MS is "0b10", the MS can recognize that the total number of frames including resource regions allocated to the MS, excluding the frame through which the current DL-MAP message has been received, is 3 as shown in FIG. 3. In addition, since the "allocation Period" parameter has been set to "0b01", the MS can determine that the number of frames of a period at intervals of which frames are allocated to the MS is "2".

Accordingly, the MS can receive downlink data through the "region 1" allocated to frames subsequent to the frame "Fr N" through which the DL-MAP message has been received, starting from a frame "Fr N+2" which is 2 frames after the frame "Fr N". The MS can repeatedly receive downlink data through the same region 1 in subsequent frames at intervals of two frames (i.e., "Fr N+4" and "Fr N+6") as the resource region of the frame "Fr N+2".

Although the method of FIG. 3 has been described above with reference to downlink as an example, the embodiments can also be applied to uplink. That is, in the case of FIG. 3, the MS can non-consecutively and periodically transmit uplink data to the BS through the "region 1" in frames allocated to the MS.

Figure 4:
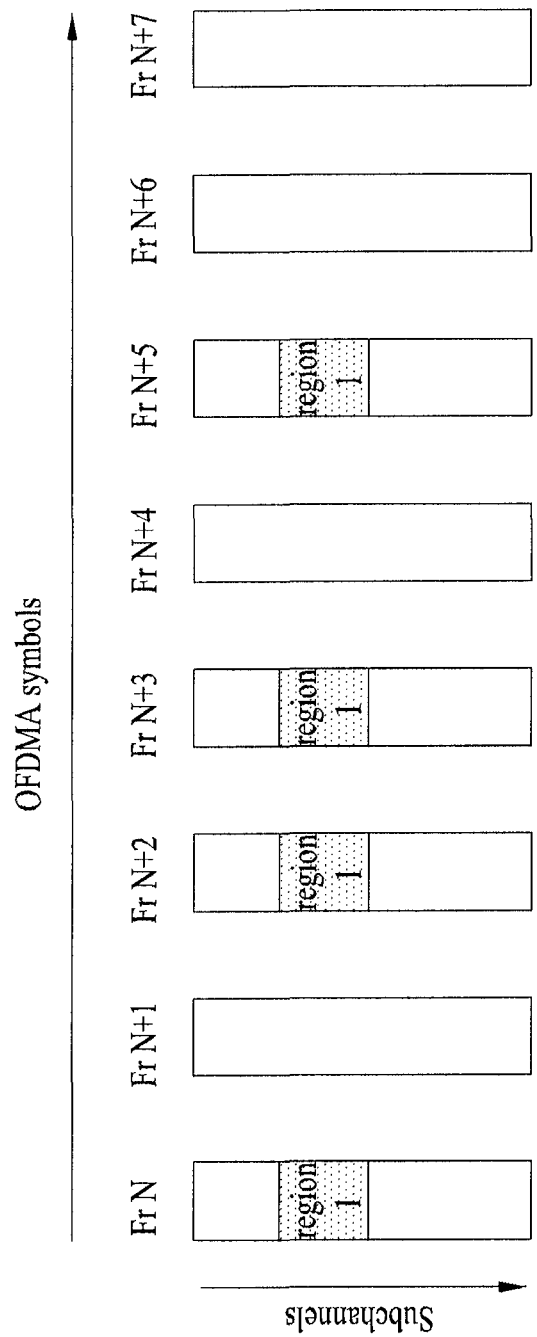
FIG. 4 illustrates a method in which downlink resource regions are non-consecutively and aperiodically allocated according to another embodiment of the present invention.

FIG. 4 illustrates a method for non-consecutively and aperiodically allocating downlink resource regions, which are allocated at the same position, to specific frames according to another embodiment of the present invention.

A horizontal axis in FIG. 4 represents the temporal order of OFDMA symbols and a vertical axis represents logical positions of subchannels.

FIG. 4 illustrates an example wherein a "Type" parameter of downlink multi-frame allocation information (DL_multi-frame allocation-2 IE) included in a DL-MAP message has been set to "1". That is, in the example of FIG. 4, frames including resource regions allocated at the same position thereof are non-consecutively and aperiodically allocated to the MS.

When the MS has received downlink multi-frame allocation information (DL_multi-frame allocation-2 IE) in a DL-MAP message through a specific frame (for example, "Fr N"), the MS can use the same allocation region not only in the specific frame through which the DL-MAP message has been received but also in specified frames (for example, Fr N+2, Fr N+3, and Fr N+5) received subsequently to the current frame. The following is a description of an example wherein the "Frame bit MAPs" parameter is "0b00010110".

By checking the "Frame bit_MAPs" parameter, the MS can recognize the positions of frames including resource regions, subsequent to the frame through which the DL-MAP message has been received as shown in FIG. 4. Specifically, when the "Frame bit_MAPS" parameter has been set to "0b00010110", the MS can recognize frames including resource regions subsequent to the frame (for example, "Fr N") thorough which the DL-MAP message has been received. Each bit "0" in "0b00010110" indicates a frame to which no resources have been allocated and "1" indicates a frame to which resources have been allocated. Accordingly, the MS can receive downlink data through the same region (i.e., "region 1") in the frames "Fr N+2", "Fr N+3", and "Fr N+5".

Although the embodiments of the present invention have been described above with reference to downlink in the example of FIG. 4, the embodiments can also be applied to uplink. That is, in the case of FIG. 4, the MS can non-consecutively and aperiodically transmit uplink data to the BS through the "region 1" in frames allocated to the MS.

According to the embodiments of the present invention described above with reference to FIG. 2 to FIG. 4, multiple non-consecutive frames are collectively allocated to the MS using multi-frame allocation information, thereby reducing the number of transmissions of a MAP message and reducing downlink overhead and signaling overhead of the MS. In the case of uplink, the number of bandwidth requests that the MS makes in order to transmit data can be reduced since the MS is previously notified of information of resource regions.

Those skilled in the art will appreciate that the present invention may be carried out in other specific ways than those set forth herein without departing from the technical idea and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It will be apparent that claims which are not explicitly dependent on each other can be combined to provide an embodiment or new claims can be added through amendment after this application is filed.

[Industrial Applicability]

The present invention can be applied to a variety of wireless access systems. The embodiments of the present invention can be applied to methods for allocating resource regions in a wireless access system. The embodiments of the present invention can also be applied to methods for collectively allocating resources in non-consecutive frames.

The invention claimed is:

1. A method for allocating resource regions in a broadband wireless access system, the method comprising:
receiving a message, including allocation information used to collectively and non-consecutively allocate identical resource regions in a plurality of non-consecutive frames, from a base station; and
non-consecutively transmitting or receiving data through the identical resource regions,
wherein the message is used to collectively allocate the plurality of non-consecutive frames including the identical resource regions instead of allocating resources on a frame-by-frame basis.

2. The method according to claim 1, wherein the message further includes first information used to collectively allocate the identical resource regions in order to periodically transmit or receive the data.

3. The method according to claim 2, wherein the first information includes information indicating the total number of the allocated plurality of non-consecutive frames and an allocation period in order to periodically transmit or receive the data.

4. The method according to claim 1, wherein the message further includes second information used to collectively allocate the identical resource regions in order to aperiodically transmit or receive data.

5. The method according to claim 4, wherein the second information includes information of positions of frames including identical resource regions in order to aperiodically transmit or receive data.

6. The method according to claim 1, wherein the message includes subchannel offset information, a number of subchannels, OFDMA symbol offset information, a number of OFDMA symbols, and a number of allocated plurality of non-consecutive frames.

7. The method according to claim 1, wherein the message includes slot offset information, duration of an allocated slot, and a number of the allocated plurality of non-consecutive frames.

8. A method for allocating resource regions in a broadband wireless access system, the method comprising:
transmitting a message, including allocation information used to collectively and non-consecutively allocate identical resource regions in a plurality of non-consecutive frames and first information used to collectively allocate the identical resource regions for periodically transmitting or receiving the data, to a mobile terminal; and
transmitting or receiving data through the allocated resource regions,
wherein the first information includes information indicating a total number of the allocated plurality of non-consecutive frames and an allocation period in order to periodically transmit or receive the data.

9. The method according to claim 8, wherein the message further includes second information used to collectively allocate the identical resource regions in order to aperiodically transmit or receive data.

10. The method according to claim 9, wherein the second information includes information of positions of frames including the identical resource regions in order to aperiodically transmit or receive data.

11. The method according to claim 1, wherein the message is a UL-MAP message.

12. The method according to claim 1, wherein the allocation information is a multi-frame allocation.

13. The method according to claim 1, further comprising:
non-consecutively transmitting the data through the identical resource regions over a same subchannel.

* * * * *